J. R. BECKETT.
ANGLE PLATE.
APPLICATION FILED APR. 11, 1919.

1,363,222.

Patented Dec. 28, 1920.
2 SHEETS—SHEET 1.

Inventor:
John R. Beckett,
by Clyde L. Rogers
his Atty.

J. R. BECKETT.
ANGLE PLATE.
APPLICATION FILED APR. 11, 1919.
1,363,222.
Patented Dec. 28, 1920.
2 SHEETS—SHEET 2.
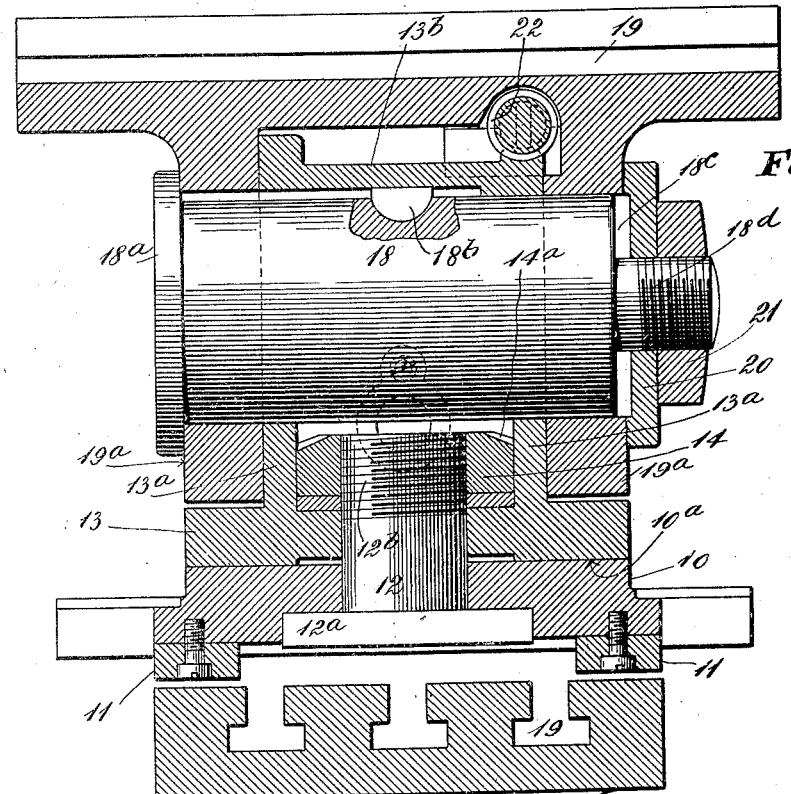
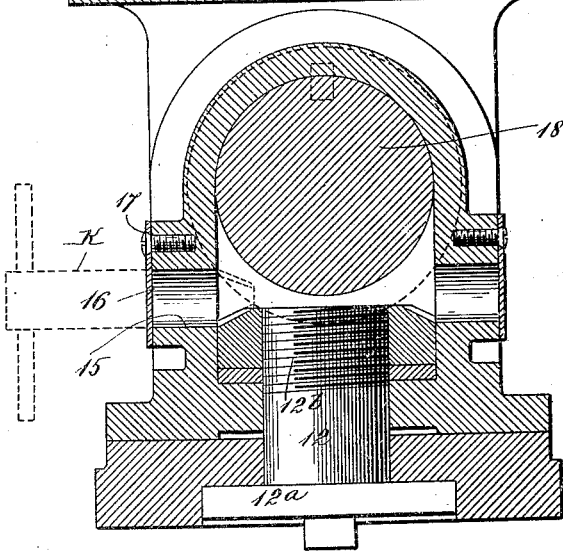
Inventor:
John R. Beckett,
by Clyde L. Rogers
his Atty.

UNITED STATES PATENT OFFICE.

JOHN R. BECKETT, OF SOMERVILLE, MASSACHUSETTS.

ANGLE-PLATE.

1,363,222.

Specification of Letters Patent.

Patented Dec. 28, 1920.

Application filed April 11, 1919. Serial No. 289,298.

*To all whom it may concern:*

Be it known that I, JOHN R. BECKETT, a citizen of the United States, and resident of Somerville, county of Middlesex, commonwealth of Massachusetts, have invented an Improvement in Angle-Plates, of which the following description, in connection with the accompanying drawings, is a specification, like characters on the drawings representing like parts in each of the several views.

This invention relates to angle plates or universal work holding attachments of metal working machines. A principal object of the invention is to provide an angle plate constructed and equipped for universal adjustments with a mounting of the top table or work holder proper that holds it with extreme rigidity and is of exceptionally great strength to resist working strains and stresses, while being at the same time capable of adjustment in any direction with the utmost facility and ease of manipulation of the working parts. The foregoing and other objects and advantages of the invention will more fully appear from the following detailed description, and the distinctive features of novelty will be pointed out in the appended claims.

Referring to the drawings:

Fig. 3 is a lengthwise vertical section; and

Fig. 4 is an intermediate transverse vertical section.

Figure 1:
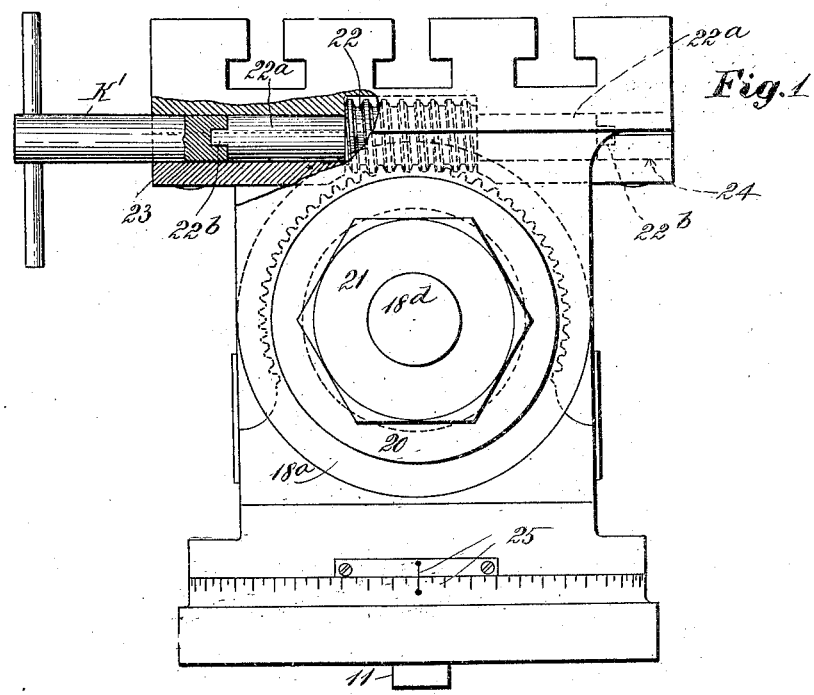
Figure 1 is an end view of an angle plate embodying my invention.
Figure 2:
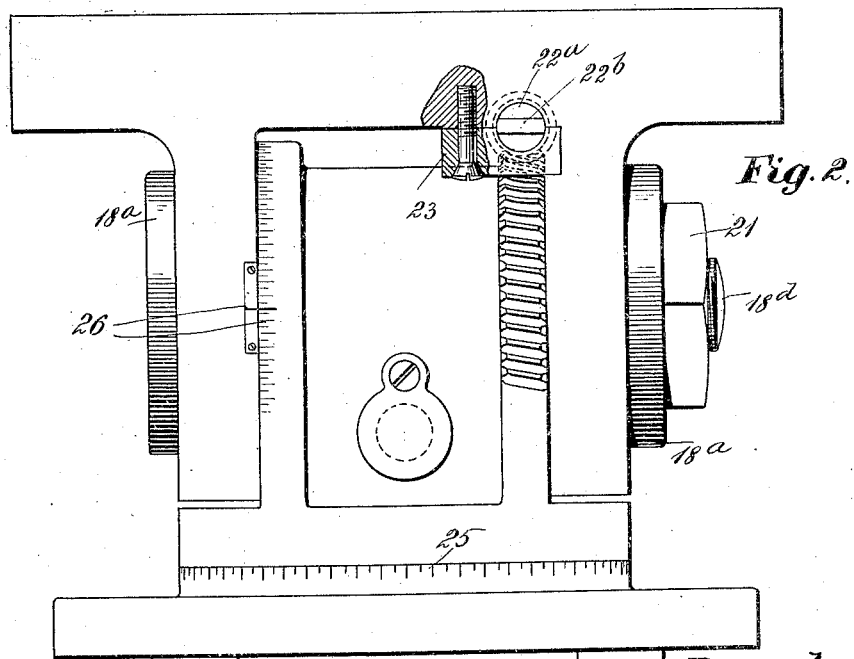
Fig. 2 is a side view thereof with a portion broken away in section.

The base 10 is suitably equipped as usual for securing to the main table or bed of the machine, having for this purpose depending blocks 11 secured thereto for engagement in locating grooves or recesses of the table or bed. The base 10 has fitted thereto a stout pivot stud 12 extending up vertically therethrough with a head 12ª countersunk into the base. On a plane finished top surface 10ª of the base 10 is mounted an intermediate plate block 13, this being fitted to, and pivoted to turn on, the stud 12 which projects up centrally therethrough with a threaded top end 12ᵇ which is engaged by a clamp nut 14 having a gear face 14ª formed on the top side thereof. This pinion face is adapted to be engaged by a pinion key K which is insertible through a hole 15 in the block 13 and is guided therein so as to turn the nut 14 when engaged therewith. This hole 15 is normally closed by a plate 16 pivoted to the block at 17 so as to be swung outward for permitting insertion of the key when operation of the nut 14 is required. Thus by loosening the nut 14 the block 13 may be angularly adjusted about the vertical pivot 12 and by application of the key K to the gear face of the nut 14 the block may be rigidly and securely clamped in adjusted position. The block 13 has spaced apart projections 13ª which are extended to form a horizontal journal mounting 13ᵇ for a relatively stout and massive pivot stud 18 which is fitted therethrough and projects at both ends therefrom. These projecting ends of the pivot stud 18 have pivotally mounted thereon depending cheek portions 19ª of the top table or work holder proper 19. One end of the pivot stud 18 is formed with an enlarged head 18ª which engages the outer side of one of the cheek pieces 19ª and an intermediate portion thereof is shown as equipped with a key 18ᵇ, securing it against turning in the journal mounting 13ᵇ. The other end of the stud 18 is reduced as seen at 18ᶜ some little distance within the outer surface of the other cheek piece 19ª and the reduced stem portion 18ᵈ which extends outward therefrom has fitted thereon a clamping washer 20 and is threaded to receive a clamp nut 21 which is adapted to press the washer 20 against the outer face of the cheek piece 19ª and at the same time draw the head 18ª into strong clamping engagement with the other cheek piece 19ª. The top table 19 has fitted to turn therein a worm 22, this worm having shaft extensions 22ª from both ends thereof which are fitted to turn in bearings of the top table that are as shown partly formed by a bearing block 23 removably clamped to the table. The shaft portions 22ª both have their extremities 22ᵇ flattened or squared or otherwise suitably formed for engagement by a key K′ that is for this purpose insertible from either side of the table through holes 24. The base 10 and the intermediate block 13 are shown as formed with suitable graduations and vernier marks 25 as usual for determining the extent of adjustment, and the top table and the projections 19ª have similar graduations 26 for determining the extent of vertical adjustment. It is to be noted that by the described construction an exceptionally strong, reliable and secure clamping provision between the top table and the intermediate block 13 is obtained, thus correcting and taking care of what has hitherto been the principal source of weakness in attachments of this kind. The single stout and massive pivot stud 18 passing completely through the opposite cheek pieces 19ª of the top table and through the intermediate bearing portion 13ᵇ of the intermediate block, when clamped up binds these members together into a strong unitary structure capable of withstanding great strains and stresses. I also consider the particular arrangement and mounting of the adjusting worm 22 with its accessibility from either side of the top table to be a feature of value and importance. The mounting of this on the top table and the provision for reaching the same from either end makes for convenience and facility in adjusting the top table from any angular position thereof to the best advantage and without likelihood of having the worm rendered inaccessible for adjustment by a work piece projecting over the adjusting means therefor. I am aware that the invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

Having described my invention, what I claim as new and desire to secure by Letters Patent is:

1. An angle plate attachment as described, comprising a base, an intermediate block mounted for horizontal angular adjustment on said base, and equipped with spaced apart upright projections connected together and having a passage therethrough constituting a continuous bearing, a top table equipped with spaced apart depending projections fitting each side of said bearing and having passages therethrough registering with said bearing passage, and a single relatively stout and massive pivot stud fitted through said passages of said cheeks and said bearing and in keyed engagement with said bearing to prevent turning with respect thereto and having a head to bear against one of said cheeks, and a reduced threaded extremity at its other end adapted to receive a clamping element to press against the other of said cheeks, and a clamping element engaged therewith.

2. An angle plate attachment as described, comprising a base, an intermediate block mounted for horizontal angular adjustment on said base, and equipped with spaced apart upright projections connected together and having a passage therethrough constituting a continuous bearing, a top table equipped with spaced apart depending projections fitting each side of said bearing and having passages therethrough registering with said bearing passage, a single relatively stout and massive pivot stud fitting through said passages of said cheeks and said bearing having a head to bear against one of said cheeks, and a reduced threaded extremity at its other end adapted to receive a clamping element to press against the other of said cheeks, a clamping member engaged therewith and means for adjusting said top table about said pivot stud on said intermediate block consisting in a worm carried by said top table arranged to be accessible for actuation from either end thereof, and a gear segment formed on the top of a projection of said intermediate block engaged by said worm.

3. An angle plate attachment, comprising a base, an intermediate block mounted for angular adjustment on said base, and equipped with an upright bearing projection, the top table pivoted for vertical adjustment to said bearing projection, and means for angularly adjusting said top table consisting in a worm mounted therein and arranged to be accessible from either end thereof and a gear segment formed on said projection engageable by said worm.

In testimony whereof, I have signed my name to this specification.

JOHN R. BECKETT.